US012347394B2

(12) United States Patent
Fang et al.

(10) Patent No.: US 12,347,394 B2
(45) Date of Patent: Jul. 1, 2025

(54) DISPLAY MODULE AND METHOD FOR DRIVING SAME, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yuan Fang, Beijing (CN); Bin Zhang, Beijing (CN); Jiaxiang Zhang, Beijing (CN); Xiaoliang Fu, Beijing (CN); Gong Chen, Beijing (CN); Jiaming Shen, Beijing (CN); Zheng Bao, Beijing (CN); Chuxiang Wang, Beijing (CN); Lian Xiang, Beijing (CN); Ziqian Li, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/272,132

(22) PCT Filed: Sep. 16, 2022

(86) PCT No.: PCT/CN2022/119438

§ 371 (c)(1),
(2) Date: Jul. 13, 2023

(87) PCT Pub. No.: WO2024/055318

PCT Pub. Date: Mar. 21, 2024

(65) Prior Publication Data

US 2024/0386853 A1 Nov. 21, 2024

(51) Int. Cl.
*G09G 3/34* (2006.01)

(52) U.S. Cl.
CPC ... *G09G 3/3406* (2013.01); *G09G 2310/0267* (2013.01); *G09G 2310/0275* (2013.01); *G09G 2360/144* (2013.01)

(58) Field of Classification Search
CPC ...... G09G 3/3406; G09G 3/3233; G09G 3/20; G09G 2310/0267; G09G 2310/0275; G09G 2360/144
See application file for complete search history.

(56) References Cited

U.S. PATENT DOCUMENTS

2007/0040774 A1 2/2007 Lee et al.
2019/0385572 A1 12/2019 Zhang et al.
(Continued)

FOREIGN PATENT DOCUMENTS

CN 108806627 A 11/2018
CN 110012162 A 7/2019
(Continued)

*Primary Examiner* — David Tung
(74) *Attorney, Agent, or Firm* — IPro, PLLC

(57) ABSTRACT

Provided is a method for driving a display module. The method includes: generating a frame reference signal in response to a display instruction; transmitting a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmitting a turn-on signal to the sensor based on the frame reference signal, wherein the turn-on signal is configured to control the sensor to collect the target parameter, and the turn-on signal is not overlapped with a period when the light emission control signal is at the first level.

18 Claims, 7 Drawing Sheets

(56) References Cited

U.S. PATENT DOCUMENTS

| | | | | |
|---|---|---|---|---|
| 2021/0090509 | A1 * | 3/2021 | Zheng | H03F 3/087 |
| 2021/0090523 | A1 * | 3/2021 | Huang | G06F 3/0421 |
| 2023/0288252 | A1 * | 9/2023 | Eaton | G09G 3/20 |

FOREIGN PATENT DOCUMENTS

| | | | |
|---|---|---|---|
| CN | 112242119 | A | 1/2021 |
| CN | 112509515 | A | 3/2021 |
| CN | 114998943 | A | 9/2022 |
| EP | 3079141 | A1 | 10/2016 |

* cited by examiner

DISPLAY MODULE AND METHOD FOR DRIVING SAME, AND DISPLAY DEVICE

This application is a U.S. national stage of international application No. PCT/CN2022/119438, filed on Sep. 16, 2022, and entitled "DISPLAY MODULE AND METHOD FOR DRIVING SAME, AND DISPLAY DEVICE", the disclosure of which is herein incorporated by reference in its entirety.

TECHNICAL FIELD

The present disclosure relates to the field of display technologies, and in particular to a display module and a method for driving the same, and a display device.

BACKGROUND

The display module generally includes a driver circuit, a display screen, and a sensor integrated below the display screen, such as an ambient light sensor (ALS) configured to collect an ambient light signal.

The driver circuit is electrically connected to the sensor and the display screen respectively. The driver circuit is configured to control the sensor to collect parameters to be collected, such as controlling the ALS to collect the ambient light signal, and is also configured to drive the display screen to emit light. Based on the case that the ALS is controlled to collect the ambient light signal, the driver circuit can adjust the brightness of the display screen according to the ambient light signal collected by the ALS, such that the brightness of the display screen is adaptive to the ambient light to ensure a better display effect.

SUMMARY

A display module and a method for driving the same, and a display device are provided. The technical solutions are as follows.

In one aspect, a method for driving the display module is provided. The display module includes: a display screen and a sensor configured to collect a target parameter. The method includes:

generating a frame reference signal in response to a display instruction;

transmitting a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmitting a turn-on signal to the sensor based on the frame reference signal, wherein the turn-on signal is configured to control the sensor to collect the target parameter, and the turn-on signal is not overlapped with a period when the light emission control signal is at the first level.

In some embodiments, the turn-on signal is disposed within a period when the light emission control signal is at the second level, and a transmission duration of the turn-on signal is less than a total duration of the period when the light emission control signal is at the second level.

In some embodiments, the method further includes:

transmitting a scanning signal to the plurality of pixels upon a turn-off transition edge of the frame reference signal; and transmitting a data signal to the plurality of pixels in the process of transmitting the scanning signal, wherein the scanning signal and the data signal are configured to charge the plurality of pixels, such that the plurality of pixels emit light in response to the light emission control signal in the case that the light emission control signal is at the first level;

and, the scanning signal is overlapped with the period when the light emission control signal is at the second level, and is overlapped with neither the period when the light emission control signal is at the first level nor the turn-on signal.

In some embodiments, the scanning signal is disposed within the period when the light emission control signal is at the second level, and a transmission duration of the scanning signal is less than the total duration of the period when the light emission control signal is at the second level.

In some embodiments, transmitting the light emission control signal to the plurality of pixels in the display screen based on the frame reference signal includes:

transmitting the light emission control signal to the plurality of pixels in the display screen based on a turn-on transition edge of the frame reference signal;

wherein for a turn-on transition edge and a turn-off transition edge of the light emission control signal at the second level, a duration from one transition edge of the light emission control signal to the turn-on transition edge of the frame reference signal is a fixed duration, and a duration from another transition edge of the light emission control signal to the turn-on transition edge of the frame reference signal is negatively correlated with target brightness of the plurality of pixels.

In some embodiments, the one transition edge is a turn-on transition edge of the light emission control signal at the second level, and the other transition edge is a turn-off transition edge of the light emission control signal at the second level; and transmitting the light emission control signal to the plurality of pixels in the display screen based on the turn-on transition edge of the frame reference signal includes:

sequentially transmitting the light emission control signal at the second level and the light emission control signal at the first level to the plurality of pixels upon the turn-off transition edge of the frame reference signal.

In some embodiments, transmitting the turn-on signal to the sensor based on the frame reference signal includes:

- transmitting a turn-on signal to the sensor upon the turn-off transition edge of the frame reference signal;
- wherein a duration from the turn-on transition edge of the turn-on signal to the turn-on transition edge of the frame reference signal is greater than a duration from the turn-on transition edge of the light emission control signal at the second level to the turn-on transition edge of the frame reference signal;
- and a duration from the turn-off transition edge of the turn-on signal to the turn-on transition edge of the frame reference signal is greater than a duration from the turn-off transition edge of the light emission control signal at the second level to the turn-on transition edge of the frame reference signal.

In some embodiments, the scanning signal is further transmitted to the plurality of pixels upon the turn-off transition edge of the frame reference signal, and the scanning signal is provided with a plurality of transition edges; and transmitting the turn-on signal to the sensor upon the turn-on transition edge of the frame reference signal includes:

transmitting the turn-on signal to the sensor upon the turn-on transition edge of the frame reference signal and a last transition edge of the plurality of transition edges of the scanning signal.

In some embodiments, the one transition edge is a turn-off transition edge of the light emission control signal at the second level, and the another transition edge is a turn-on transition edge of the light emission control signal at the second level; and transmitting the light emission control signal to the plurality of pixels in the display screen based on a turn-on transition edge of the frame reference signal includes:

transmitting the light emission control signal at the second level to the plurality of pixels prior to the turn-on transition edge of the frame reference signal, and transmitting the light emission control signal at the first level to the plurality of pixels upon the turn-off transition edge of the frame reference signal.

In some embodiments, transmitting the turn-on signal to the sensor based on the frame reference signal includes:

- transmitting a turn-on signal to the sensor prior to the turn-on transition edge of the frame reference signal;
- wherein a duration from the turn-on transition edge of the turn-on signal to the turn-on transition edge of the frame reference signal is less than a duration from the turn-on transition edge of the light emission control signal at the second level to the turn-on transition edge of the frame reference signal;
- and, a duration from the turn-off transition edge of the turn-on signal to the turn-on transition edge of the frame reference signal is less than a duration from the turn-off transition edge of the light emission control signal at the second level to the turn-on transition edge of the frame reference signal.

In some embodiments, the scanning signal is further transmitted to the plurality of pixels upon the turn-off transition edge of the frame reference signal, and the scanning signal is provided with a plurality of transition edges; and transmitting the turn-on signal to the sensor prior to the turn-on transition edge of the frame reference signal includes:

transmitting the turn-on signal to the sensor prior to the turn-on transition edge of the frame reference signal and a first transition edge of the plurality of transition edges of the scanning signal.

On the other hand, a display module is provided. The display module includes: a display screen, a sensor configured to collect a target parameter, and a driver circuit, wherein the driver circuit is electrically connected to a plurality of pixels in the display screen and the sensor respectively, and the driver circuit is configured to:

generate a frame reference signal in response to a display instruction;

transmit a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmit a turn-on signal to the sensor based on the frame reference signal, wherein the turn-on signal is configured to control the sensor to collect the target parameter, and the turn-on signal is not overlapped with a period when the light emission control signal is at the first level.

In some embodiments, the driver circuit includes a reference signal generation circuit, a light emission control circuit, and a turn-on signal generation circuit, wherein the reference signal generation circuit is electrically connected to the light emission control circuit and the turn-on signal generation circuit respectively, the light emission control circuit is also electrically connected to the plurality of pixels, and the turn-on signal generation circuit is also electrically connected to the sensor;

the reference signal generation circuit is configured to: generate the frame reference signal in response to the display instruction;

the light emission control circuit is configured to: transmit the light emission control signal to the plurality of pixels in the display screen based on the frame reference signal, wherein the light emission control signal at the first level is configured to control the plurality of pixels to emit light, and the light emission control signal at the second level is configured to control the plurality of pixels not to emit light; and the turn-on signal generation circuit is configured to: transmit the turn-on signal to the sensor based on the frame reference signal, wherein the turn-on signal is configured to control the sensor to collect the target parameter.

In some embodiments, the driver circuit further includes a gate driver circuit and a source driver circuit, wherein the gate driver circuit is electrically connected to the reference signal generation circuit and the plurality of pixels respectively, and the source driver circuit is also electrically connected to the plurality of pixels;

the gate driver circuit is configured to: transmit a scanning signal to the plurality of pixels upon the turn-off transition edge of the frame reference signal; and the source driver circuit is configured to: transmit a data signal to the plurality of pixels in a process that the gate driver circuit is transmitting the scanning signal, wherein the scanning signal and the data signal are configured to charge the plurality of pixels, such that the plurality of pixels emit light in response to the light emission control signal in the case that the light emission control signal is at the first level;

and, the scanning signal is overlapped with the period when the light emission control signal is at the second level, and is overlapped with neither the period when the light emission control signal is at the first level nor the turn-on signal.

In some embodiments, the sensor includes an ambient light sensor; and the target parameter includes an ambient light signal.

In still another aspect, a display device is provided. The display device includes a power supply assembly and the display module according to the above aspect, wherein the power supply assembly is electrically connected to the display module and configured to supply power to the display module.

BRIEF DESCRIPTION OF THE DRAWINGS

For clearer descriptions of the technical solutions according to the embodiments of the present invention, the drawings required to be used in the description of the embodiments are briefly introduced below. It is apparent that the drawings in the description below are only some embodiments of the present invention, and for those of ordinary skill in the art, other drawings may be obtained from the drawings without creative efforts.

DETAILED DESCRIPTION

For clearer descriptions of the objects, technical solutions, and advantages of the present disclosure, the embodiments of the present disclosure are further described in detail below with reference to the drawings.

With reference to the background, the sensor is disposed below the display screen, in the case that the ambient light sensor ALS is collecting the ambient light signal, the ambient light sensor ALS is adversely affected not only by the optical signal sent by the display screen, but also by the transmittance of the display screen. The higher the transmittance, the better the precision of collection and the more the amount of collection; and conversely, the lower the transmittance, the poorer the precision of collection and the less the amount of collection.

However, with the progress of display technologies, for improving the quality of a display image and ensuring a better display effect of the display screen, the resolution of the display screen is continuously increased, that is, the quantity of pixels on the display screen is increased, and the materials of the display screen are continuously changed. This is accompanied by lower transmittance of the display screen, which affects the precision of the collection of the ALS to collect the ambient light signal. The collection of the ambient light signal is the product of the amount of collection per unit time and time. Based on this, for ensuring that the performance of the ALS does not degrade within the same time, it is necessary to improve the precision of collection of the ALS in collecting the ambient light signal and reduce the external interference on collecting the ambient light signal (e.g., the brightness of the display screen).

The embodiments of the present disclosure provide a method for driving a display module. The method provides a novel signal timing to solve the problem of poor precision of collection of the ALS in collecting the ambient light signal due to the lower display screen transmittance and external interference. In addition, the effect to the pixel in the display screen is avoided in the case that the ALS is collecting the ambient light signal.

Figure 1:
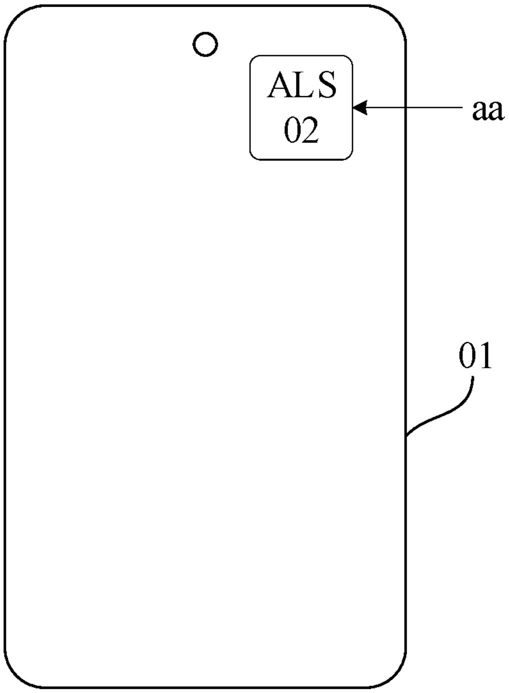
FIG. 1 is a schematic structural diagram of a display module according to some embodiments of the present disclosure.

FIG. 1 is a schematic structural diagram of a display module according to some embodiments of the present disclosure. As shown in FIG. 1, the display module includes a display screen 01 and a sensor 02 configured to collect a target parameter.

The display screen 01 is generally provided with a region aa defined to dispose the sensor 02, and the region aa is disposed below the display screen 01 to ensure a better resolution of the display screen 01 without opening a hole on the display screen 01. The sensor 02 is integrated below the display screen 01 and disposed in the region aa. In some other embodiments, the region aa is disposed at other positions of the display screen 01 to dispose the sensor 02.

Exemplarily, in the embodiments of the present disclosure, the sensor 02 is an ambient light sensor ALS configured to collect an ambient light signal, that is, the target parameter is an ambient light signal. The ambient light signal collected by the ambient light sensor ALS is defined to enable the driver circuit of the display module to adjust the brightness of the display screen according to the ambient light signal, such that the brightness of the display screen is adjusted to be adaptive to the ambient light. In some other embodiments, the sensor 02 is other types of the sensor, such as a photosensitive sensor configured to implement a shooting function. The following embodiments of the present disclosure take the sensor 02 as an ambient light sensor ALS and the target parameter as an ambient light signal as examples for description.

Figure 2:
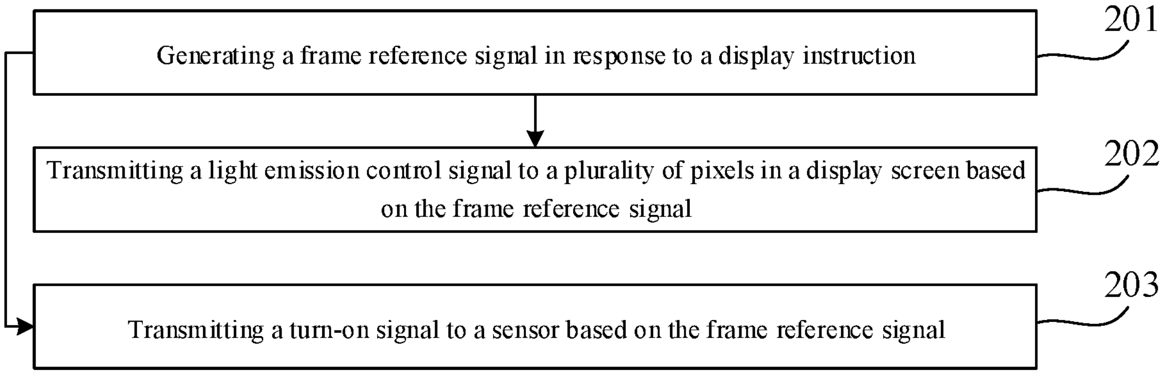
FIG. 2 is a flowchart of a method for driving a display module according to some embodiments of the present disclosure.

On the basis of FIG. 1, FIG. 2 shows a flowchart of a method for driving a display module according to some embodiments of the present disclosure. As shown in FIG. 2, the method includes the following steps.

In step 201, a frame reference signal is generated in response to a display instruction.

In some embodiments, the display module according to some embodiments of the present disclosure further includes a driver circuit besides the structure shown in FIG. 1. The driver circuit generates a frame reference signal Vsync upon receiving the display instruction for instructing the display screen 01 to display pictures. Exemplarily, FIG. 3 shows a diagram of signal timing.

Figure 3:
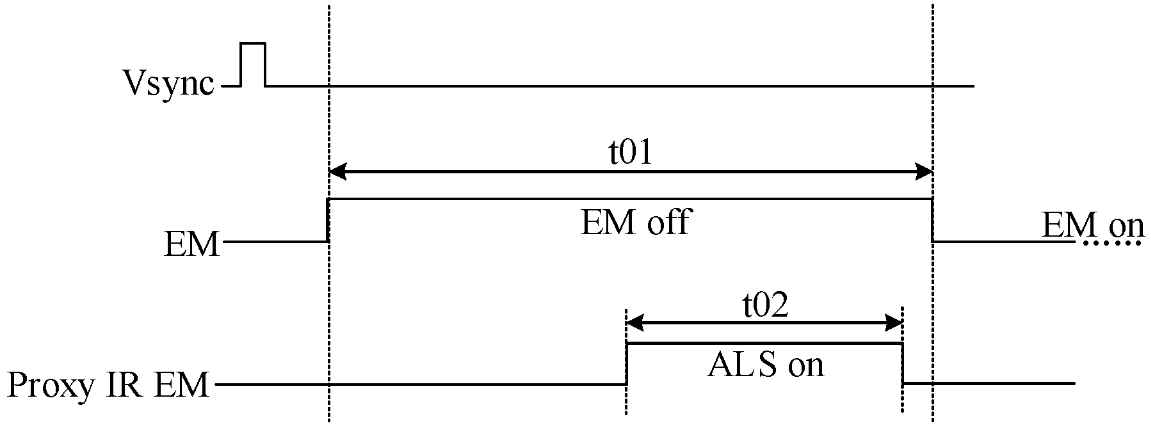
FIG. 3 is a diagram of signal timing according to some embodiments of the present disclosure.

With reference to FIG. 3, for each frame scan, the frame reference signal Vsync is provided with a pulse limited by a turn-on transition edge and a turn-off transition edge, and in the case that the pulse arrives, it can be regarded that a frame is about to refresh. The embodiments of the present disclosure define the pulse as the frame reference signal Vsync.

For the frame reference signal Vsync, one transition edge of the turn-on transition edges and the turn-off transition edge is a transient transition edge (which is referred to as a rising edge) that transitions from a low level to a high level, and the other transition edge is a transient transition edge (which is referred to as a falling edge) that transitions from a high level to a low level. In addition, in the case that the level (i.e., an active level) of the pulse of the frame reference signal Vsync is the high level shown in FIG. 3, the turn-on transition edge of the frame reference signal Vsync is the rising edge shown in FIG. 3, and the turn-off transition edge of the frame reference signal Vsync is the falling edge shown in FIG. 3.

In some other embodiments, the level of the pulse of the frame reference signal Vsync is also a low level. In this case, the turn-on transition edge of the frame reference signal Vsync is a falling edge, and the turn-off transition edge of the frame reference signal Vsync is a rising edge. It should be noted that it is similar for the turn-on transition edge and the turn-off transition edge of other signals, and the following embodiments are not repeated in the case that they relate to the turn-on transition edge and the turn-off transition edge.

In step 202, a light emission control signal is transmitted to a plurality of pixels in the display screen based on the frame reference signal.

In the embodiments of the present disclosure, with reference to FIGS. 1 and 3, the driver circuit also transmits a light emission control signal EM to a plurality of pixels in the display screen 01 based on the generated frame reference signal Vsync. In addition, the light emission control signal EM is at a first level and a second level respectively at different periods.

The light emission control signal EM at the first level is configured to control a plurality of pixels in the display panel 01 to emit light, and the light emission control signal EM at the second level is configured to control a plurality of pixels in the display panel 01 not to emit light. Accordingly, as shown in FIG. 3, the emission control signal EM at the first level is identified as an "EM on" signal, and the light emission control signal EM at the second level is identified as an "EM off" signal.

In some embodiments, FIG. 3 shows that the first level of the light emission control signal EM is a low level, and the second level of the light emission control signal EM is a high level. Thus, with reference to the above embodiments and FIG. 3, it can be seen that the turn-on transition edge of the light emission control signal EM at the second level is a rising edge, and the turn-off transition edge of the light emission control signal EM at the second level is a falling edge. The turn-on transition edge of the light emission control signal EM at the first level is a falling edge, and the turn-off transition edge of the light emission control signal EM at the first level is a rising edge.

In some embodiments, the first level of the light emission control signal EM is also a high level, and accordingly, the second level of the light emission control signal EM is a low level. Thus, the turn-on transition edge of the light emission control signal EM at the second level is a falling edge, and the turn-off transition edge of the light emission control signal EM at the second level is a rising edge. The turn-on transition edge of the light emission control signal EM at the first level is a rising edge, and the turn-off transition edge of the light emission control signal EM at the first level is a falling edge.

In addition, in the case that a plurality of pixels are controlled not to emit light, the second level of the light emission control signal EM is an active level, and the first level is an inactive level. In the case that a plurality of pixels are controlled to emit light, the first level of the light emission control signal EM is an active level, and the second level is an inactive level.

In step 203, a turn-on signal is transmitted to the sensor based on the frame reference signal.

In the embodiments of the present disclosure, with reference to FIGS. 1 and 3, the driver circuit also transmits a turn-on signal Proxy IR EM to the sensor 02 based on the frame reference signal Vsync. The turn-on signal Proxy IR EM is configured to control the sensor 02 to collect the target parameter to be collected, that is, the turn-on signal Proxy IR EM is configured to control the sensor 02 to turn on in an operating state. For example, in the case that the sensor 02 is an ambient light sensor ALS, the turn-on signal Proxy IR EM is defined to control the ambient light sensor ALS to turn on (identified as "ALS on" in FIG. 3) to collect the ambient light signal. The turn-on signal is also referred to as a photosensitive turn-on signal.

In some embodiments, the active level of the turn-on signal Proxy IR EM shown in FIG. 3 is a high level. Thus, with reference to the above embodiments and FIG. 3, it can be seen that the turn-on transition edge of the turn-on signal Proxy IR EM is a rising edge, and the turn-off transition edge of the turn-on signal Proxy IR EM is a falling edge. In some other embodiments, the active level of the turn-on signal Proxy IR EM is also a low level. Thus, the turn-on transition edge of the turn-on signal Proxy IR EM is a falling edge, and the turn-off transition edge of the turn-on signal Proxy IR EM is a rising edge.

In addition, with reference to FIG. 3, it can also be seen that in the embodiments of the present disclosure, the period for transmitting the turn-on signal Proxy IR EM is not overlapped with the period of the light emission control signal EM at the first level, that is, the turn-on signal Proxy IR EM is not overlapped with the EM on signal, and the period when the sensor 02 collects the target parameter is not overlapped with the period when a plurality of pixels emit light, in other words, the sensor 02 collects the target parameter in the period when the display screen 01 is not lit. Thus, the effect of the optical signal sent by the display screen 01 on collecting the target parameter is reliably avoided to ensure a better precision of collection.

For example, in the case that the sensor 02 is an ambient light sensor ALS, the period when the ambient light sensor ALS collects the ambient light signal is not overlapped with the period when a plurality of pixels emit light, in other words, the ambient light sensor ALS can collect the ambient light signal in the period when the display screen 01 is not lit. Thus, the effect of the optical signal sent by the display screen 01 on collecting the ambient light signal is reliably avoided to ensure a better precision of the collection of the ambient light signal. In addition, on this basis, even if the transmittance of the display screen 01 is lower, as the ambient light sensor ALS does not collect the ambient light signal in the light emission period of a plurality of pixels in the display screen 01, the precision of collection is ensured to be as good as possible to ensure more amount of collection, and reliability of adjusting the screen brightness is effectively improved.

It should be noted that for the frame reference signal Vsync and the turn-on signal Proxy IR EM, the low level portion shown in FIG. 3 is considered as a non-supply signal, or also considered as a signal to supply low level (the low level refers to an inactive level herein).

In summary, the embodiments of the present disclosure provide a method for driving a display module. The display module includes a display screen and a sensor configured to collect a target parameter. In the method, a frame reference signal is generated in response to a display instruction, a light emission control signal is transmitted to a plurality of pixels in the display screen to control the light emission state of the plurality of pixels based on the frame reference signal, and a turn-on signal is transmitted to the sensor to control the sensor to collect the target parameter. As the period of the turn-on signal is not overlapped with the period of level defined to control the plurality of pixels not to emit light in the light emission control signal, that is, the display screen does not emit light in the case that the sensor collects the target parameter, therefore the effect of an optical signal sent by the display screen on collecting target parameter is avoided to ensure a better precision of collection for the sensor in collecting the target parameter. For example, in the case that the sensor is an ambient light sensor configured to collect an ambient light signal, the effect of the optical signal sent by the display screen on collecting the ambient light signal is avoided.

In some embodiments, with continued reference to FIG. 3, it can be seen that in the embodiments of the present disclosure, the turn-on signal Proxy IR EM is disposed within the period when the light emission control signal EM is at the second level. In addition, the transmission duration t02 of the turn-on signal Proxy IR EM is less than the total duration t01 of the period when the light emission control signal EM is at the second level. That is, the rising edge and falling edge of the turn-on signal Proxy IR EM are both disposed within the range of the period limited by the rising and the falling edge of the EM off signal. Thus, the turn-on signal Proxy IR EM is further ensured to be not overlapped with period when the light emission control signal EM is the first level, the sensor 02 is ensured to collect the target parameter within the period when the display screen 01 does not emit light, the effect of the light emission of the display screen 01 on collecting the target parameter is avoided, and therefore the precision of collection of the target parameter is ensured to be better. For example, in the case that the sensor 02 is an ambient light sensor ALS, the precision of collection for the ambient light sensor ALS in collecting the ambient light signal is further reliably ensured.

In some other embodiments, the rising edge of the turn-on signal Proxy IR EM is overlapped with the rising edge of the EM off signal, and/or, the falling edge of the turn-on signal Proxy IR EM is overlapped with the falling edge of the EM off signal. As long as the turn-on signal Proxy IR EM is ensured not to be overlapped with the EM on signal.

Figure 4:
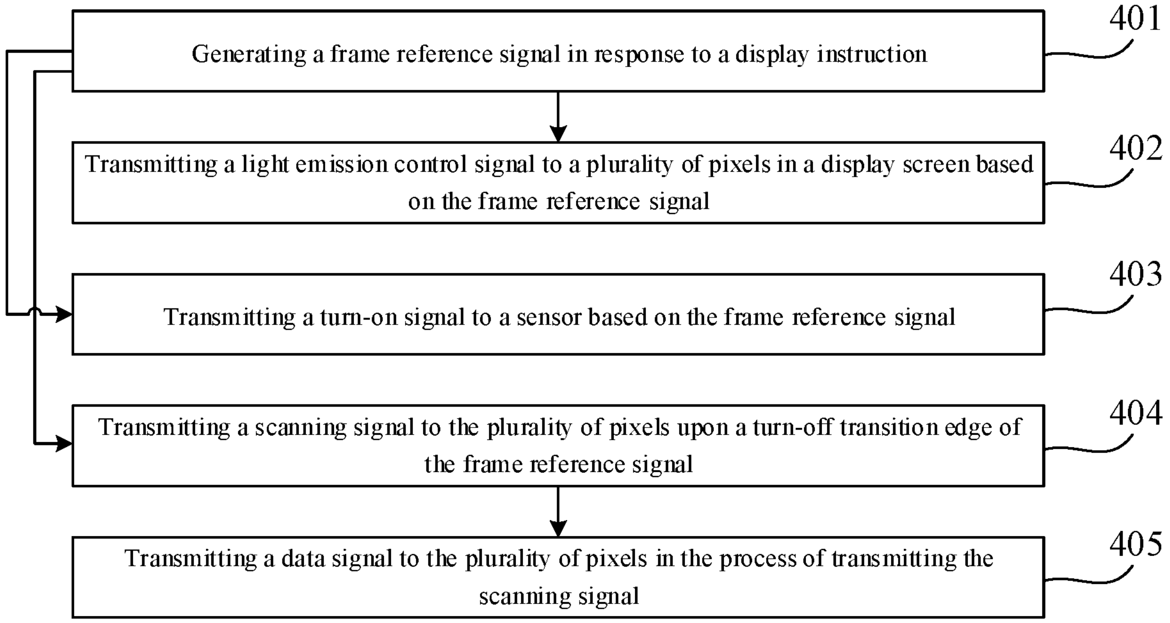
FIG. 4 is a flowchart of the method for driving another display module according to some embodiments of the present disclosure.

FIG. 4 is a flowchart of the method for driving another display module according to some embodiments of the present disclosure. As shown in FIG. 4, the method includes the following steps.

In step 401, a frame reference signal is generated in response to a display instruction.

According to the above embodiments, in the embodiments of the present disclosure, the frame reference signal Vsync is generated to indicate the arrival of a frame scanning in the case that the driver circuit receives the display instruction.

In step 402, a light emission control signal is transmitted to a plurality of pixels in the display screen based on the frame reference signal.

According to the above embodiments, with reference to FIG. 1, in the embodiments of the present disclosure, the driver circuit transmits the light emission control signal EM to a plurality of pixels in the display panel 01 based on the generated frame reference signal Vsync. In addition, the light emission control signal EM at the first level is configured to control the plurality of pixels to emit light, and the light emission control signal EM at the second level is configured to control the plurality of pixels not to emit light. That is, with reference to FIG. 3, in the period when the EM off signal is transmitted to a plurality of pixels, a plurality of pixels have not been lit, and the display panel 01 does not emit light; and in the period when the EM on signal is transmitted to a plurality of pixels, a plurality of pixels are lit, and the display panel 01 emits light.

In some embodiments, the light emission control signal EM is transmitted to the plurality of pixels in the display screen 01 by the driver circuit based on the turn-on transition edge (e.g., the rising edge shown in FIG. 3) of the frame reference signal Vsync. In some other embodiments, the light emission control signal EM is also transmitted to the plurality of pixels in the display screen 01 by the driver circuit based on the turn-off transition edge (e.g., the falling edge shown in FIG. 3) of the frame reference signal Vsync.

In addition, the light emission control signal EM at the second level (i.e., the EM off signal) is provided with a turn-on transition edge (e.g., the rising edge shown in FIG. 3) and a turn-off transition edge (e.g., the falling edge shown in FIG. 3), wherein a duration from one transition edge to the turn-on transition edge of the frame reference signal Vsync is a fixed duration, and a duration from the other transition edge to the turn-on transition edge of the frame reference signal Vsync is negatively correlated with the target brightness of a plurality of pixels. That is, the duration from a transition edge of the turn-on transition edge and the turn-off transition edge of the EM off signal to the turn-on transition edge of the frame reference signal Vsync is fixed as a certain duration, and it is also understood that the EM off signal delays a certain duration relative to the turn-on transition edge of the frame reference signal Vsync, and the duration from the other transition edge to the turn-on transition edge of the frame reference signal Vsync is adjusted, such that the purpose of adjusting the brightness of a plurality of pixels is achieved.

It should be noted that the target brightness according to some embodiments of the present disclosure refers to the brightness to be displayed in the current frame of a plurality of pixels, not the current brightness. The duration from the other transition edge to the turn-on transition edge of the frame reference signal Vsync is adjusted, and the brightness to be displayed is correspondingly adjusted, that is, the brightness of the plurality of pixels is adjusted. In addition, in the case that the duration from the other transition edge to the turn-on transition edge of the frame reference signal Vsync is disposed to be longer, that is, the longer the duration of transmitting the EM off signal, the lower the brightness of the plurality of pixels during the light emission, that is, the darker the display brightness of the display screen 01; in the case that the duration from the other transition edge to the turn-on transition edge of the frame reference signal Vsync is disposed to be shorter, that is, the shorter the duration of transmitting the EM off signal, the higher the brightness of a plurality of pixels during the light emission, that is, the brighter the display brightness of the display screen 01.

Figure 5:
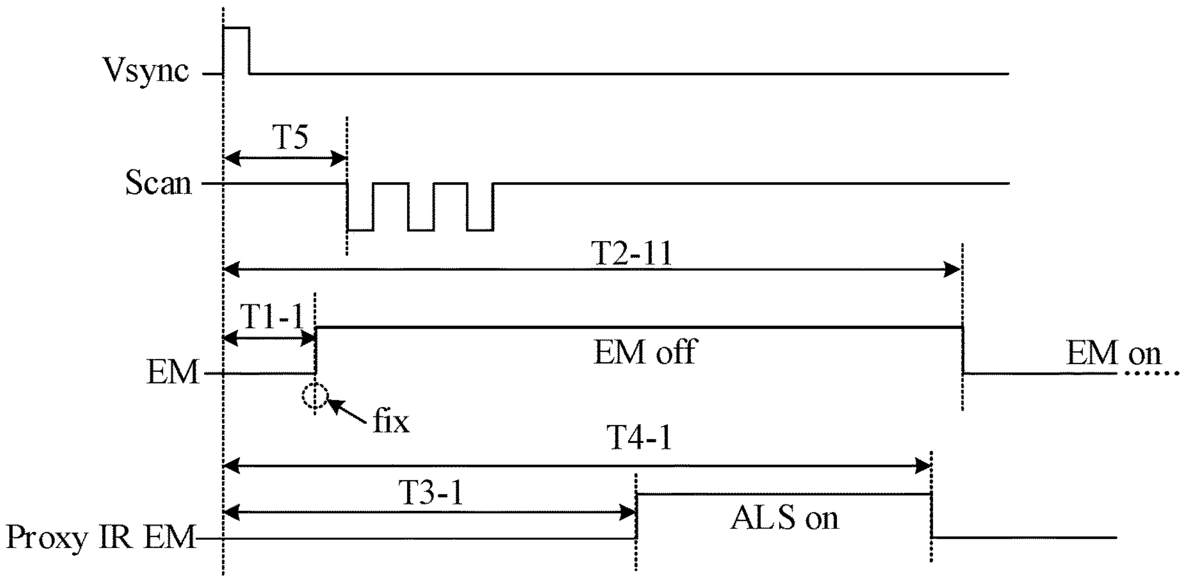
FIG. 5 is another diagram of signal timing according to some embodiments of the present disclosure.

As an optional implementation, with reference to another diagram of signal timing shown in FIGS. 3 and 5, one transition edge is a turn-on transition edge (e.g., the rising edge shown in the figure) of the light emission control signal EM at the second level, and the other transition edge is a turn-off transition edge (e.g., the falling edge shown in the figure) of the light emission control signal EM at the second level. That is, one fixed transition edge is the turn-on transition edge of the EM off signal, which delays a fixed duration T1-1 relative to the turn-on transition edge of the frame reference signal Vsync. The other transition edge is the turn-off transition edge of the EM off signal, which moves flexibly to achieve flexible adjustment of the pixel brightness.

On this basis, in the embodiments of the present disclosure, with reference to FIGS. 3 and 5, the driver circuit sequentially transmits the light emission control signal EM at the second level and the light emission control signal EM at the first level to the plurality of pixels upon the turn-off transition edge of the frame reference signal Vsync. That is, the driver circuit sequentially transmits the EM off signal and the EM on signal to the plurality of pixels upon transmitting the frame reference signal Vsync.

Figure 6:
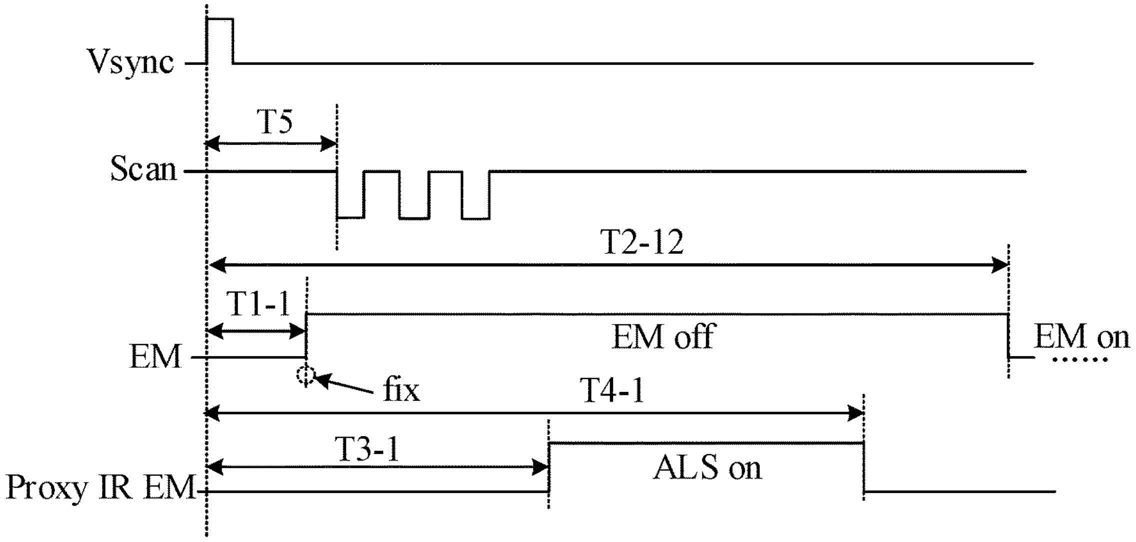
FIG. 6 is still another diagram of signal timing according to some embodiments of the present disclosure.

In addition, in the case that high brightness needs to be displayed, that is, in the case that the target brightness of the plurality of pixels needs to be controlled to be high, the duration from the turn-off transition edge of the EM off signal to the turn-on transition edge of the frame reference signal Vsync is T2-11 as shown in FIG. 5; and in the case that low brightness needs to be displayed, that is, in the case that the target brightness of the plurality of pixels needs to be controlled to be low, the duration from the turn-off transition edge of the EM off signal to the turn-on transition edge of the frame reference signal Vsync is T2-12 as shown in FIG. 6.

That is, T2-12 in FIG. 6 is greater than T2-11 FIG. 5. It can be considered that the light emission control signal EM controlling the second level, that is, the turn-off transition edge of the EM off signal moves to the right relative to the turn-on transition edge of the frame reference signal Vsync, such that the purpose of prolonging the transmission duration of the EM off signal is achieved, and the brightness of the plurality of pixels is lower in the case that the EM on signal arrives. In the embodiments of the present disclosure, as the level of the EM off signal is high level, extending the transmission duration of the EM-off signal is also considered as increasing the forward duty ratio of the light emission control signal EM. It should be noted that the low brightness and the high brightness are relative terms.

Figure 7:
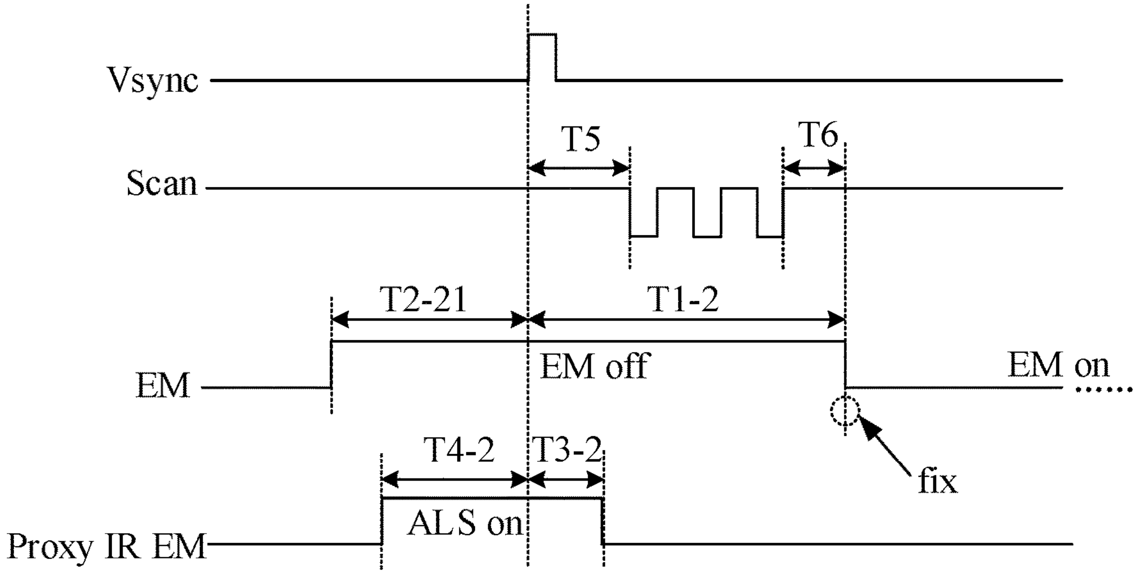
FIG. 7 is yet still another diagram of signal timing according to some embodiments of the present disclosure.

As another optional implementation, with reference to still another diagram of signal timing shown in FIG. 7, one transition edge is a turn-off transition edge (e.g., the falling edge shown in the figure) of the light emission control signal EM at the second level, and the other transition edge is a turn-on transition edge (e.g., the rising edge shown in the figure) of the light emission control signal EM at the second level. That is, one fixed transition edge is a turn-off transition edge of the EM off signal, which delays a fixed duration T1-2 relative to the turn-on transition edge of the frame reference signal Vsync. The other transition edge is a turn-on transition edge of the EM off signal, which moves flexibly to achieve flexible adjustment of the pixel brightness.

On this basis, in the embodiments of the present disclosure, with reference to FIG. 7, it can be seen that the driver circuit transfers the light emission control signal EM at the second level to a plurality of pixels prior to the turn-on transition edge of the frame reference signal Vsync and transfers the light emission control signal EM at the first level to the plurality of pixels upon the turn-off transition edge of the frame reference signal Vsync. That is, the driver circuit transmits the EM off signal to the plurality of pixels prior to the arrival of the turn-on transition edge of the frame reference signal Vsync (which is also understood as prior to the transmitting of frame reference signal Vsync); and the driver circuit transmits the EM on signal to the plurality of pixels upon the end of the turn-off transition edge of the frame reference signal Vsync (which is understood as upon the transmitting of the frame reference signal Vsync). Thus, with reference to in FIG. 7, it can be seen that rising edge and the falling edge of the frame reference signal Vsync are disposed within the period limited by the rising edge and the falling edge of the EM off signal. In some other embodiments, the driver circuit also transmits the EM off signal to the plurality of pixels at the moment of the arrival of the turn-on transition edge of the frame reference signal Vsync, that is, the turn-on transition edge of the EM off signal is also overlapped with the turn-on transition edge of the frame reference signal Vsync.

Figure 8:
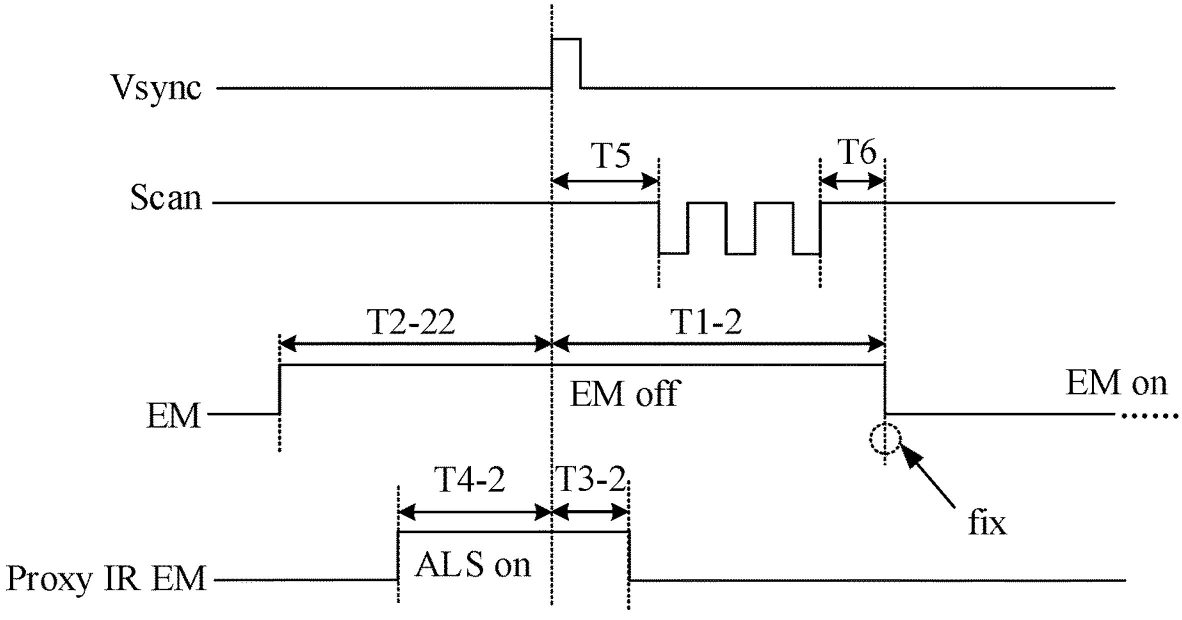
FIG. 8 is yet still another diagram of signal timing according to some embodiments of the present disclosure.

In addition, in the case that high brightness needs to be displayed, that is, in the case that the target brightness of the plurality of pixels needs to be controlled to be high, the duration from the turn-on transition edge of the EM off signal to the turn-on transition edge of the frame reference signal Vsync is T2-21 shown in FIG. 7; and in the case that low brightness needs to be displayed, that is, in the case that the target brightness of the plurality of pixels needs to be controlled to be low, the duration from the turn-on transition edge of the EM off signal to the turn-on transition edge of the frame reference signal Vsync is T2-22 shown in FIG. 8. That is, T2-22 in FIG. 8 is greater than T2-21 FIG. 7. It can be considered that the turn-on transition edge that controls the EM off signal moves to the left relative to the turn-on transition edge of the frame reference signal Vsync, such that the purpose of prolonging the transmission duration of the EM off signal is achieved, and the brightness of a plurality of pixels is lower in the case that the EM on signal arrives.

In addition, comparing FIGS. 5 and 6 as well as FIGS. 7 and 8, it can be seen that on the basis of displaying high brightness and disposing the turn-on signal Proxy IR EM and EM on signal not to overlap, in the case that low brightness is displayed, the transmission period of the EM off signal is prolonged, and the turn-on signal Proxy IR EM and the EM on signal are correspondingly ensured not to overlap, that is, the turn-on signal Proxy IR EM is ensured to be reliably transmitted to the sensor 02 in the transmission duration of the EM off signal, thereby avoiding the effect on collecting the target parameter.

In step 403, a turn-on signal is transmitted to the sensor based on the frame reference signal.

According to the above embodiments, the turn-on signal Proxy IR EM is transmitted to the sensor 02 by the driver circuit based on the frame reference signal, and the turn-on signal Proxy IR EM is defined to control the sensor 02 to collect the target parameter to be collected. For example, in the case that the sensor 02 is an ambient light sensor ALS, the turn-on signal Proxy IR EM is defined to control the ambient light sensor ALS to collect the ambient light signal. In addition, the turn-on signal Proxy IR EM is not overlapped with the period when the light emission control signal EM is at the first level (i.e., the EM on signal) to ensure that the target parameter is reliably collected in the case that a plurality of pixels do not emit light to improve the precision of collection.

As the turn-on signal Proxy IR EM is correlated with the light emission control signal EM, the way of transmitting the turn-on signal Proxy IR EM is different for different embodiments shown in FIGS. 5 and 6, or FIGS. 7 and 8.

For example, in an embodiment in which the light emission control signal EM is transmitted in step 402 above, that is, in the case that the light emission control signal EM at the second level and the light emission control signal EM at the first level are sequentially transmitted to the plurality of pixels upon the turn-off transition edge of the frame reference signal Vsync. With continued reference to FIGS. 5 and 6, it can be seen that the driver circuit transmits the turn-on signal Proxy IR EM to the sensor 02 upon the turn-off transition edge of the frame reference signal Vsync. That is, upon the transmitting of the frame reference signal Vsync, the turn-on signal Proxy IR EM starts to be transmitted to control the sensor 02 to turn on to collect the target parameter.

In addition, in this case, a duration T3-1 from the turn-on transition edge (e.g., the rising edge shown in the figure) of the turn-on signal Proxy IR EM to the turn-on transition edge of the frame reference signal Vsync is greater than a duration T1-1 from the turn-on transition edge of the light emission control signal EM (i.e., the EM off signal) at the second level to the turn-on transition edge of the frame reference signal Vsync.

In addition, the duration T4-1 from the turn-off transition edge (e.g., the falling edge shown in the drawing) of the turn-on signal Proxy IR EM to the turn-on transition edge of the frame reference signal Vsync is less than the duration T2-11/T2-12 from the turn-off transition edge of the light emission control signal EM (i.e., the EM off signal) at the second level to the turn-on transition edge of the frame reference signal Vsync. On this basis, the duration T3-1 is considered as the delay duration of the turn-on transition edge of the turn-on signal Proxy IR EM relative to the turn-on transition edge of the frame reference signal Vsync. Thus, the turn-on signal Proxy IR EM is effectively ensured not to overlap with the EM on signal.

For another example, in another embodiment in which the light emission control signal EM is transmitted in step 402 above, that is, in the case that the light emission control signal EM at the second level is transmitted to the plurality of pixels prior to the turn-on transition edge of the frame reference signal Vsync, and the light emission control signal EM at the first level is transmitted to the plurality of pixels upon the turn-off transition edge of the frame reference signal Vsync. With continued reference to FIGS. 7 and 8, it can be seen that the driver circuit transmits the turn-on signal Proxy IR EM to the sensor 02 prior to the turn-on transition edge of the frame reference signal Vsync. That is, prior to the transmitting of the frame reference signal Vsync, the turn-on signal Proxy IR EM starts to be transmitted to control the sensor 02 to turn on to collect the target parameter.

In some other embodiments, the turn-on signal Proxy IR EM is also transmitted to the sensor 02 at the moment of the arrival of the turn-on transition edge of the frame reference signal Vsync, that is, the turn-on transition edge of the turn-on signal Proxy IR is overlapped with the turn-on transition edge of the frame reference signal Vsync.

In addition, in this case, a duration T4-2 from the turn-on transition edge of the turn-on signal Proxy IR EM to the turn-on transition edge of the frame reference signal Vsync is less than a time duration T2-21/T2-22 from the turn-on transition edge of the light emission control signal EM (i.e., the EM off signal) at the second level to the turn-on transition edge at the frame reference signal Vsync.

In addition, a duration T3-2 from the turn-off transition edge of the turn-on signal Proxy IR EM to the turn-on transition edge of the frame reference signal Vsync is less than the duration T1-2 from the turn-off transition edge of the light emission control signal EM (i.e., the EM off signal) at the second level to the turn-on transition edge of the frame reference signal Vsync. On this basis, T3-2 is considered as the delay duration of the turn-off transition edge of the turn-on signal Proxy IR EM relative to the turn-on transition edge of the frame reference signal Vsync. Thus, the turn-on signal Proxy IR EM is effectively ensured not to overlap with the EM on signal.

In step 404, a scanning signal is transmitted to the plurality of pixels upon the turn-off transition edge of the frame reference signal Vsync.

With continued reference to FIGS. 5 to 8, it can also be seen that in the embodiments of the present disclosure, the driver circuit also transmits a scanning signal Scan, which is also referred to as a gate driver signal Gate, to the plurality of pixels upon the turn-off transition edge of the frame reference signal Vsync. In addition, the scanning signal Scan generally is provided with a plurality of transition edges, that is, the scanning signal Scan is a pulse signal. Exemplarily, only three transition edges are shown in the figure.

In step 405, a data signal is transmitted to the plurality of pixels in the process of transmitting the scanning signal.

In addition, the driver circuit transmits the data signal Data (not shown in the figure) to the plurality of pixels in the process of transmitting the scanning signal Scan. The scanning signal Scan and the data signal Data are configured to charge the plurality of pixels, such that the plurality of pixels emit light in response to the light emission control signal EM in the case that the light emission control signal EM is at the first level. In the case that the transmitting of the scanning signal Scan is stopped, the transmitting of the data signal Data is also naturally stopped.

In addition, with reference to FIGS. 5 to 8, it can also be seen that the scanning signal Scan is overlapped with the period when the light emission control signal EM is at the second level, that is, the scanning signal Scan is overlapped with the EM off signal. In addition, the scanning signal Scan is not overlapped with the period when the light emission control signal EM is at the first level, that is, the scanning signal Scan is not overlapped with the EM off signal.

In other words, the driver circuit transmits the scanning signal Scan and the data signal Data to the plurality of pixels while transmitting the light emission control signal EM (i.e., EM off signal) at the second level to the plurality of pixels to charge the plurality of pixels, and stops transmitting the scanning signal Scan and the data signal Data to the plurality of pixels prior to transmitting the light emission control signal EM (that is, EM on signal) at the first level to the plurality of pixels.

In addition, with continued reference to FIGS. 5 to 8, it can also be seen that the scanning signal Scan is not overlapped with the turn-on signal Proxy IR EM. That is, in the embodiments of the present disclosure, the period when the sensor 02 (e.g., the ambient light sensor ALS) collects the target parameter (e.g., the ambient light signal) is not overlapped with the period when the plurality of pixels are charged, and the sensor 02 collects the target parameter in the period when the charging of a plurality of pixels is stopped. Thus, the effect of the collected target parameter on the plurality of pixels is reliably avoided. In addition, the effect includes the effect on the performance of a thin film transistor included in a pixel circuit in a pixel, which leads to the decrease in the lifetime of a plurality of pixels.

In some embodiments, the scanning signal Scan shown in FIGS. 5 to 8 is disposed in the period when the light emission control signal EM is at the second level, and the transmission duration of the scanning signal Scan is less than the total duration of the period when the light emission control signal EM is at the second level. That is, the transition edge of the scanning signal Scan transmitted to the plurality of pixels is disposed within the period limited by the rising edge and the falling edge of the EM off signal.

In addition, with reference to FIGS. 5 to 8, it can also be seen that the duration from the first transition edge of the scanning signal Scan to the turn-on transition edge of the frame reference signal Vsync is T5, that is, the delay duration T5 relative to the turn-on transition edge of the frame reference signal Vsync.

In addition, for the solutions shown in FIGS. 5 and 6, T5 is less than the duration T1-1 from a fixed turn-on transition edge (e.g., a rising edge) in the EM off signal to the turn-on transition edge (e.g., a rising edge) of the frame reference signal Vsync, and is also less than the duration T3-1 from the turn-on transition edge (e.g., a rising edge) of the turn-on signal Proxy IR EM to the turn-on transition edge of the frame reference signal Vsync. For the solutions shown in FIGS. 7 and 8, T5 is less than the duration T1-2 from a fixed turn-off transition edge (e.g., a falling edge) in the EM off signal to the turn-on transition edge of the frame reference signal Vsync, and is greater than the duration T3-2 from the turn-off transition edge (e.g., a falling edge) of the turn-on signal Proxy IR EM to the turn-on transition edge of the frame reference signal Vsync. Thus, the scanning signal Scan is ensured to overlap with neither the turn-on signal Proxy IR EM nor the EM on signal, but only overlap with the EM off signal.

In an embodiment in which the light emission control signal EM is transmitted in step 402 above, that is, in the case that the light emission control signal EM at the second level and the light emission control signal EM at the first level are sequentially transmitted to the plurality of pixels upon the turn-off transition edge of the frame reference signal Vsync. With continued reference to FIGS. 5 and 6, it can be seen that in the embodiments of the present disclosure, the driver circuit transmits the turn-on signal Proxy IR EM to the sensor 02 upon the turn-on transition edge of the frame reference signal Vsync and the last transition edge of a plurality of transition edges of the scanning signal Scan. That is, the driver circuit transmits the turn-on signal Proxy IR EM to the sensor 02 upon writing the data signal Data and prior to transmitting the EM on signal. Thus, the turn-on signal Proxy IR EM is ensured not to overlap with the scanning signal Scan.

In another embodiment in which the light emission control signal EM is transmitted in step 402 above, that is, in the case that the light emission control signal EM at the second level is transmitted to the plurality of pixels prior to the turn-on transition edge of the frame reference signal Vsync, and the light emission control signal EM at the first level is transmitted to the plurality of pixels upon the turn-off transition edge of the frame reference signal Vsync. With continued reference to FIGS. 7 and 8, it can be seen that the driver circuit transmits the turn-on signal Proxy IR EM to the sensor 02 prior to the turn-on transition edge of the frame reference signal Vsync and the first transition edge of a plurality of transition edges of the scanning signal Scan. That is, the driver circuit transmits the turn-on signal Proxy IR EM to the sensor 02 prior to writing the data signal Data and prior to transmitting the EM on signal. Thus, the turn-on signal Proxy IR EM is ensured not to be overlapped with the scanning signal Scan.

In addition, FIGS. 7 and 8 also schematically identify a duration T6 from the last transition edge of the scanning signal Scan to the turn-off transition edge of the EM off signal. In addition, with reference to FIGS. 5 to 8, it can also be seen that the transmission duration of the frame reference signal Vsync is the least among the plurality of signals. The transmission duration of the turn-on signal Proxy IR EM is flexibly disposed according to the requirement, such that the target parameter is reliably collected.

In summary, the embodiments of the present disclosure provide a method for driving a display module. The display module includes a display screen and a sensor configured to collect a target parameter. In the method, a frame reference signal is generated in response to a display instruction, a light emission control signal is transmitted to a plurality of pixels in the display screen to control the light emission state of the plurality of pixels based on the frame reference signal, and a turn-on signal is transmitted to the sensor to control the sensor to collect the target parameter. As the period of the turn-on signal is not overlapped with a period of level defined to control the plurality of pixels not to emit light in the light emission control signal, that is, the display screen does not emit light in the case that the sensor collects the target parameter, therefore the effect of an optical signal sent by the display screen on collecting target parameter is avoided to ensure a better precision of collection for the sensor in collecting the target parameter. For example, in the case that the sensor is an ambient light sensor configured to collect an ambient light signal, the effect of the optical signal sent by the display screen on collecting the ambient light signal is avoided.

Figure 9:
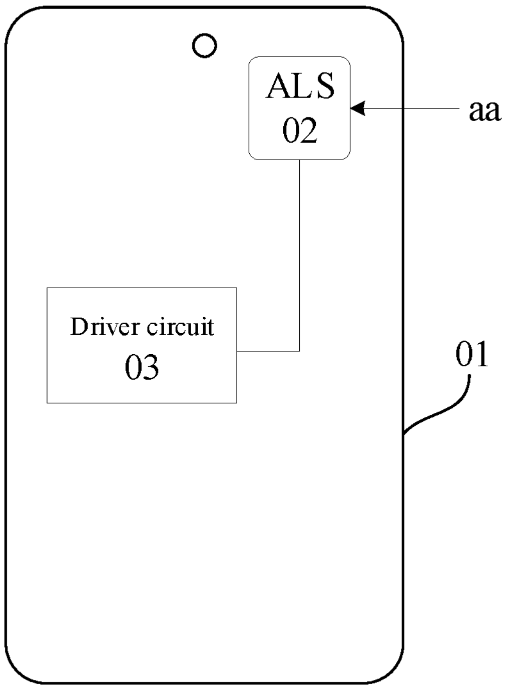
FIG. 9 is a schematic structural diagram of another display module according to some embodiments of the present disclosure.

FIG. 9 is a schematic structural diagram of a display module according to some embodiments of the present disclosure. With reference to FIGS. 1 and 9, it can be seen that the display module includes: the display screen 01, the sensor 02 configured to collect the target parameter, and the driver circuit 03. The driver circuit 03 is electrically connected to a plurality of pixels (not shown in the figure) in the display screen 01 and the sensor 02 respectively. In addition, with reference to the method embodiments shown in FIG. 2, it can be seen that in the present disclosure, the driver circuit 03 is configured to:

generate a frame reference signal in response to a display instruction;

transmit a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmit a turn-on signal to the sensor based on the frame reference signal, wherein the turn-on signal is configured to control the sensor to collect the target parameter, and is not overlapped with a period when the light emission control signal is at the first level.

For example, with reference to the above embodiments and FIG. 9, the sensor 02 according to some embodiments of the present disclosure is an ambient light sensor ALS, and accordingly, the target parameter is an ambient light signal.

Figure 10:
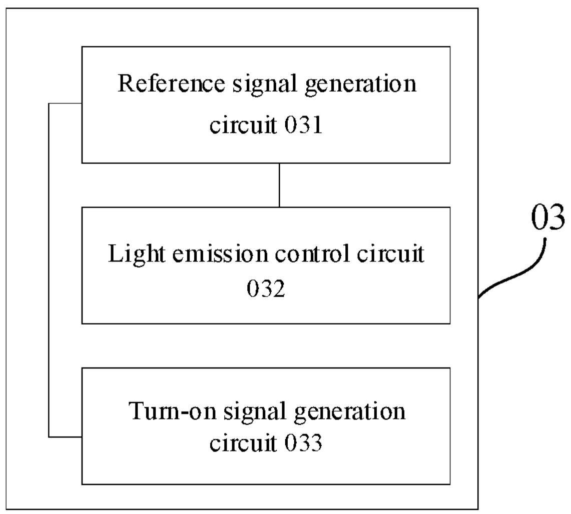
FIG. 10 is a schematic structural diagram of a driver circuit in a display module according to some embodiments of the present disclosure.

In some embodiments, FIG. 10 is a schematic structural diagram of the driver circuit in a display module according to some embodiments of the present disclosure. As shown in FIG. 10, the driver circuit 03 includes a reference signal generation circuit 031, a light emission control circuit 032, and a turn-on signal generation circuit 033.

The reference signal generation circuit 031 is electrically connected to the light emission control circuit 032 and the turn-on signal generation circuit 033 respectively, the light emission control circuit 032 is electrically connected to the plurality of pixels, and the turn-on signal generation circuit 033 is also electrically connected to the sensor 02.

The reference signal generation circuit 031 is configured to: generate the frame reference signal in response to the display instruction.

The light emission control circuit 032 is configured to: transmit the light emission control signal to the plurality of pixels in the display screen based on the frame reference signal. In addition, the light emission control signal at the first level is configured to control the plurality of pixels to emit light, and the light emission control signal at the second level is configured to control the plurality of pixels not to emit light.

The turn-on signal generation circuit 033 is configured to: transmit the turn-on signal to the sensor based on the frame reference signal. In addition, the turn-on signal is configured to control the sensor to collect the target parameter.

Figure 11:
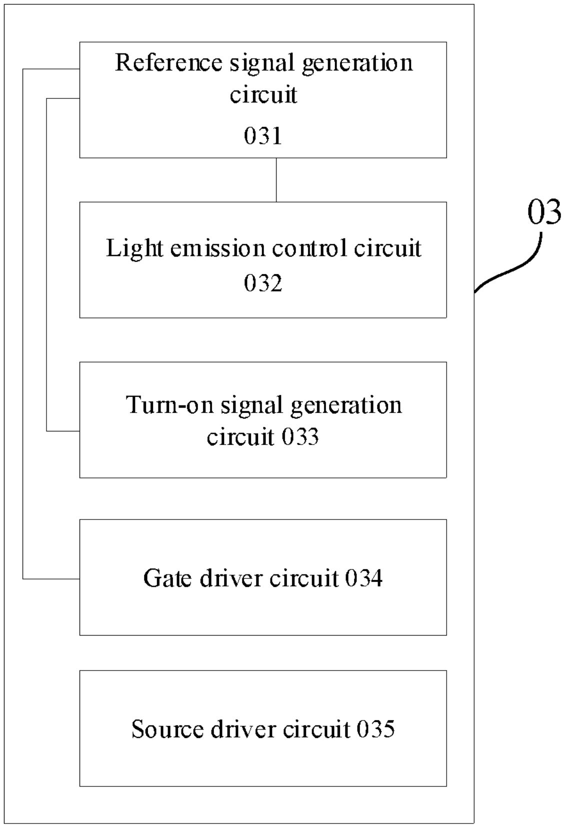
FIG. 11 is a schematic structural diagram of a driver circuit in another display module according to some embodiments of the present disclosure.

In some embodiments, FIG. 11 is a schematic structural diagram of a driver circuit in another display module according to some embodiments of the present disclosure. As shown in FIG. 11, the driver circuit 03 further includes a gate driver circuit 034 and a source driver circuit 035.

The gate driver circuit 034 is electrically connected to the reference signal generation circuit 031 and the plurality of pixels respectively, and the source driver circuit 035 is also electrically connected to a plurality of pixels.

The gate driver circuit 034 is configured to: transmit a scanning signal to a plurality of pixels upon the turn-off transition edge of the frame reference signal.

The source driver circuit 035 is configured to: transmit a data signal to a plurality of pixels in the process that the gate driver circuit 034 is transmitting the scanning signal.

The scanning signal and the data signal are configured to charge the plurality of pixels, such that the plurality of pixels emit light in response to the light emission control signal in the case that the light emission control signal is at the first level. In addition, the scanning signal is overlapped with a period when the light emission control signal is at the second level, and the scanning signal is overlapped with neither the period when the light emission control signal is at the first level nor the turn-on signal.

It should be noted that for the implementation of the steps executed by each circuit included in the display module, reference is made to the above method embodiments, and the device side are not repeated.

In summary, the embodiments of the present disclosure provide a display module. The display module includes a display screen, a sensor configured to collect a target parameter, and a driver circuit. The driver circuit generates a frame reference signal in response to a display instruction, transmits a light emission control signal to a plurality of pixels in the display screen to control the light emission state of the plurality of pixels based on the frame reference signal, and transmits a turn-on signal to the sensor to control the sensor to collect the target parameter. As a period of the turn-on signal is not overlapped with a period of level defined to control the plurality of pixels not to emit light in the light emission control signal, that is, the display screen does not emit light in the case that the sensor collects the target parameter, therefore the effect of an optical signal sent by the display screen on collecting target parameter is avoided to ensure a better precision of collection for the sensor in collecting the target parameter. For example, in the case that the sensor is an ambient light sensor configured to collect an ambient light signal, the effect of the optical signal sent by the display screen on collecting the ambient light signal is avoided.

Figure 12:
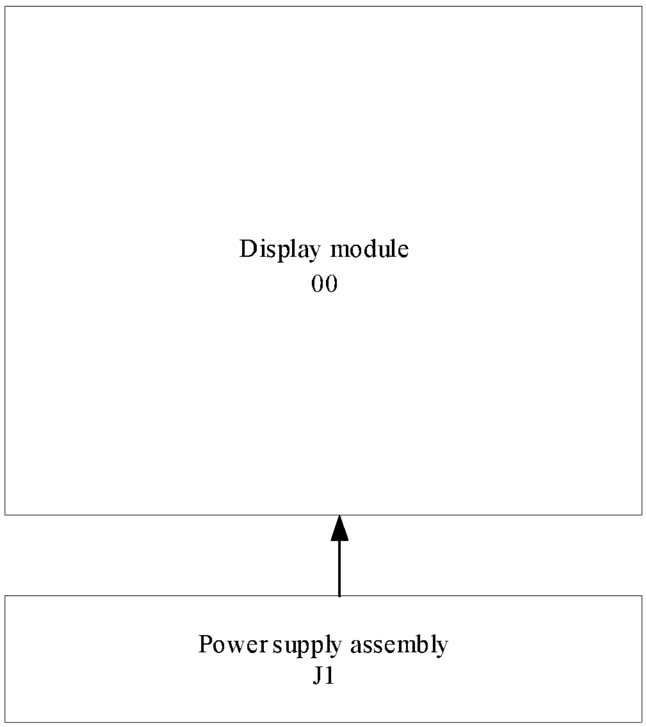
FIG. 12 is a schematic structural diagram of a display device according to some embodiments of the present disclosure.

FIG. 12 is a schematic structural diagram of a display device according to some embodiments of the present disclosure. As shown in FIG. 12, the display device includes: a power supply assembly J1 and a display module 00 shown in FIG. 1 and any one of FIGS. 9 to 11.

The power supply assembly J1 is electrically connected to the display module 00 to supply power to the display module 00.

In some embodiments, according the embodiments of the present disclosure, the display device is any product or component with a display function, such as an organic light-emitting diode (OLED) display device, a mobile phone, a tablet computer, a flexible display device, a television, and a display.

Terms used in detailed description of the present disclosure are defined to merely explain the embodiments of the present disclosure and are not intended to limit of the present disclosure. Unless otherwise defined, technical or scientific terms used in detailed description of the present disclosure should have the ordinary meanings as understood by those of ordinary skill in the art to which the present disclosure belongs.

For example, word "first", "second", "third" or the like, which is used in the specification and claims of the present disclosure, is not intended to indicate any order, quantity or importance, but is merely defined to distinguish different components.

Likewise, "a", "an" or other similar words does not indicate a limitation of quantity, but rather the presence of at least one.

"Include", "comprise" or other similar words means that the elements or objects stated before "include" or "comprise" encompass the elements or objects and equivalents thereof listed after "include" or "comprise", but does not exclude other elements or objects.

"Up", "down", "left", "right" or the like is only defined to indicate relative position relationship. In a case that the absolute position of the described object is changed, the relative position relationship may be changed accordingly. "Connected" or "coupled" refers to an electrical connection.

"And/or" indicates that three relationships may be present. For example, A and/or B may indicate that only A is present, both A and B are present, and only B is present. The symbol "/" generally indicates an "or" relationship between the associated objects.

Described above are merely optional embodiments of the present disclosure and are not intended to limit the present disclosure. Any modifications, equivalents, improvements, and the like, made within the spirit and principle of the present disclosure, should be included in the protection scope of the present disclosure.

What is claimed is:

1. A method for driving a display module comprising a display screen and a sensor configured to collect a target parameter, comprising:

generating a frame reference signal in response to a display instruction;

transmitting a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmitting a turn-on signal to the sensor based on the frame reference signal, wherein the turn-on signal is configured to control the sensor to collect the target parameter, and the turn-on signal is not overlapped with a period when the light emission control signal is at the first level;

wherein transmitting the light emission control signal to the plurality of pixels in the display screen based on the frame reference signal comprises:

transmitting the light emission control signal to the plurality of pixels in the display screen based on a turn-on transition edge of the frame reference signal;

wherein for a turn-on transition edge and a turn-off transition edge of the light emission control signal at the second level, a duration from one transition edge of the light emission control signal to the turn-on transition edge of the frame reference signal is a fixed duration, and a duration from another transition edge of the light emission control signal to the turn-on transition edge of the frame reference signal is negatively correlated with target brightness of the plurality of pixels.

2. The method according to claim 1, wherein the turn-on signal is disposed within a period when the light emission control signal is at the second level, and a transmission duration of the turn-on signal is less than a total duration of the period when the light emission control signal is at the second level.

3. The method according to claim 1, wherein the method further comprises:

transmitting a scanning signal to the plurality of pixels upon a turn-off transition edge of the frame reference signal; and transmitting a data signal to the plurality of pixels in a process of transmitting the scanning signal, wherein the scanning signal and the data signal are configured to charge the plurality of pixels, such that the plurality of pixels emit light in response to the light emission control signal in the case that the light emission control signal is at the first level;

and, the scanning signal is overlapped with a period when the light emission control signal is at the second level, and is overlapped with neither the period when the light emission control signal is at the first level nor the turn-on signal.

4. The method according to claim 3, wherein the scanning signal is disposed within the period when the light emission control signal is at the second level, and a transmission duration of the scanning signal is less than the total duration of the period when the light emission control signal is at the second level.

5. The method according to claim 1, wherein the one transition edge is a turn-on transition edge of the light emission control signal at the second level, and the another transition edge is a turn-off transition edge of the light emission control signal at the second level; and transmitting the light emission control signal to the plurality of pixels in the display screen based on the turn-on transition edge of the frame reference signal comprises:

sequentially transmitting the light emission control signal at the second level and the light emission control signal at the first level to the plurality of pixels upon the turn-off transition edge of the frame reference signal.

6. The method according to claim 5, wherein transmitting the turn-on signal to the sensor based on the frame reference signal comprises:

transmitting a turn-on signal to the sensor upon the turn-off transition edge of the frame reference signal;

wherein a duration from the turn-on transition edge of the turn-on signal to the turn-on transition edge of the frame reference signal is greater than a duration from the turn-on transition edge of the light emission control signal at the second level to the turn-on transition edge of the frame reference signal;

and, a duration from the turn-off transition edge of the turn-on signal to the turn-on transition edge of the frame reference signal is greater than a duration from the turn-off transition edge of the light emission control signal at the second level to the turn-on transition edge of the frame reference signal.

7. The method according to claim 6, wherein the scanning signal is further transmitted to the plurality of pixels upon the turn-off transition edge of the frame reference signal, and the scanning signal is provided with a plurality of transition edges; and transmitting the turn-on signal to the sensor upon the turn-on transition edge of the frame reference signal comprises:

transmitting the turn-on signal to the sensor upon the turn-on transition edge of the frame reference signal and a last transition edge of the plurality of transition edges of the scanning signal.

8. The method according to claim 1, wherein the one transition edge is a turn-off transition edge of the light emission control signal at the second level, and the another transition edge is a turn-on transition edge of the light emission control signal at the second level; and transmitting the light emission control signal to the plurality of pixels in the display screen based on the turn-on transition edge of the frame reference signal comprises:

transmitting the light emission control signal at the second level to the plurality of pixels prior to the turn-on transition edge of the frame reference signal, and transmitting the light emission control signal at the first level to the plurality of pixels upon the turn-off transition edge of the frame reference signal.

9. The method according to claim 8, wherein transmitting the turn-on signal to the sensor based on the frame reference signal comprises:

transmitting a turn-on signal to the sensor prior to the turn-on transition edge of the frame reference signal;

wherein a duration from the turn-on transition edge of the turn-on signal to the turn-on transition edge of the frame reference signal is less than a duration from the turn-on transition edge of the light emission control signal at the second level to the turn-on transition edge of the frame reference signal;

and, a duration from the turn-off transition edge of the turn-on signal to the turn-on transition edge of the frame reference signal is less than a duration from the turn-off transition edge of the light emission control signal at the second level to the turn-on transition edge of the frame reference signal.

10. The method according to claim 9, wherein the scanning signal is further transmitted to the plurality of pixels upon the turn-off transition edge of the frame reference signal, and the scanning signal is provided with a plurality of transition edges; and transmitting the turn-on signal to the sensor prior to the turn-on transition edge of the frame reference signal comprises:

transmitting the turn-on signal to the sensor prior to the turn-on transition edge of the frame reference signal and a first transition edge of the plurality of transition edges of the scanning signal.

11. A display module, comprising: a display screen, a sensor configured to collect a target parameter, and a driver circuit, wherein the driver circuit is electrically connected to a plurality of pixels in the display screen and the sensor respectively, and the driver circuit is configured to:

generate a frame reference signal in response to a display instruction;

transmit a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmit a turn-on signal to the sensor based on the frame reference signal, wherein the turn-on signal is configured to control the sensor to collect the target parameter, and the turn-on signal is not overlapped with a period when the light emission control signal is at the first level;

wherein transmitting the light emission control signal to the plurality of pixels in the display screen based on the frame reference signal comprises:

transmitting the light emission control signal to the plurality of pixels in the display screen based on a turn-on transition edge of the frame reference signal;

wherein for a turn-on transition edge and a turn-off transition edge of the light emission control signal at the second level, a duration from one transition edge of the light emission control signal to the turn-on transition edge of the frame reference signal is a fixed duration, and a duration from another transition edge of the light emission control signal to the turn-on transition edge of the frame reference signal is negatively correlated with target brightness of the plurality of pixels.

12. The display module according to claim 11, wherein the driver circuit comprises: a reference signal generation circuit, a light emission control circuit, and a turn-on signal generation circuit, wherein the reference signal generation circuit is electrically connected to the light emission control circuit and the turn-on signal generation circuit respectively, the light emission control circuit is also electrically connected to the plurality of pixels, and the turn-on signal generation circuit is also electrically connected to the sensor;

the reference signal generation circuit is configured to: generate the frame reference signal in response to the display instruction;

the light emission control circuit is configured to: transmit the light emission control signal to the plurality of pixels in the display screen based on the frame reference signal, wherein the light emission control signal at the first level is configured to control the plurality of pixels to emit light, and the light emission control signal at the second level is configured to control the plurality of pixels not to emit light; and the turn-on signal generation circuit is configured to: transmit the turn-on signal to the sensor based on the frame reference signal, wherein the turn-on signal is configured to control the sensor to collect the target parameter.

13. The display module according to claim 11, wherein the driver circuit further comprises: a gate driver circuit and a source driver circuit, wherein the gate driver circuit is electrically connected to the reference signal generation circuit and the plurality of pixels respectively, and the source driver circuit is also electrically connected to the plurality of pixels;

the gate driver circuit is configured to: transmit a scanning signal to the plurality of pixels upon the turn-off transition edge of the frame reference signal; and the source driver circuit is configured to: transmit a data signal to the plurality of pixels in a process that the gate driver circuit is transmitting the scanning signal, wherein the scanning signal and the data signal are configured to charge the plurality of pixels, such that the plurality of pixels emit light in response to the light emission control signal in the case that the light emission control signal is at the first level;

and, the scanning signal is overlapped with a period when the light emission control signal is at the second level, and is overlapped with neither the period when the light emission control signal is at the first level nor the turn-on signal.

14. The display module according to claim 11, wherein the sensor comprises an ambient light sensor; and the target parameter comprises an ambient light signal.

15. A display device, comprising: a power supply assembly and a display module, wherein the power supply assembly is electrically connected to the display module and configured to supply power to the display module; wherein the display module comprises a display screen, a sensor configured to collect a target parameter, and a driver circuit, wherein the driver circuit is electrically connected to a plurality of pixels in the display screen and the sensor respectively, and the driver circuit is configured to:

generate a frame reference signal in response to a display instruction;

transmit a light emission control signal to a plurality of pixels in the display screen based on the frame reference signal, wherein the light emission control signal at a first level is configured to control the plurality of pixels to emit light, and the light emission control signal at a second level is configured to control the plurality of pixels not to emit light; and transmit a turn-on signal to the sensor based on the frame reference signal, wherein the turn-on signal is configured to control the sensor to collect the target parameter, and the turn-on signal is not overlapped with a period when the light emission control signal is at the first level;

wherein transmitting the light emission control signal to the plurality of pixels in the display screen based on the frame reference signal comprises:

transmitting the light emission control signal to the plurality of pixels in the display screen based on a turn-on transition edge of the frame reference signal;

wherein for a turn-on transition edge and a turn-off transition edge of the light emission control signal at the second level, a duration from one transition edge of the light emission control signal to the turn-on transition edge of the frame reference signal is a fixed duration, and a duration from another transition edge of the light emission control signal to the turn-on transition edge of the frame reference signal is negatively correlated with target brightness of the plurality of pixels.

16. The display device according to claim 15, wherein the driver circuit comprises: a reference signal generation circuit, a light emission control circuit, and a turn-on signal generation circuit, wherein the reference signal generation circuit is electrically connected to the light emission control circuit and the turn-on signal generation circuit respectively, the light emission control circuit is also electrically connected to the plurality of pixels, and the turn-on signal generation circuit is also electrically connected to the sensor;

the reference signal generation circuit is configured to: generate the frame reference signal in response to the display instruction;

the light emission control circuit is configured to: transmit the light emission control signal to the plurality of pixels in the display screen based on the frame reference signal, wherein the light emission control signal at the first level is configured to control the plurality of pixels to emit light, and the light emission control signal at the second level is configured to control the plurality of pixels not to emit light; and the turn-on signal generation circuit is configured to: transmit the turn-on signal to the sensor based on the frame reference signal, wherein the turn-on signal is configured to control the sensor to collect the target parameter.

17. The display device according to claim 15, wherein the driver circuit further comprises: a gate driver circuit and a source driver circuit, wherein the gate driver circuit is electrically connected to the reference signal generation circuit and the plurality of pixels respectively, and the source driver circuit is also electrically connected to the plurality of pixels;

the gate driver circuit is configured to: transmit a scanning signal to the plurality of pixels upon the turn-off transition edge of the frame reference signal; and the source driver circuit is configured to: transmit a data signal to the plurality of pixels in a process that the gate driver circuit is transmitting the scanning signal, wherein the scanning signal and the data signal are configured to charge the plurality of pixels, such that the plurality of pixels emit light in response to the light emission control signal in the case that the light emission control signal is at the first level;

and, the scanning signal is overlapped with a period when the light emission control signal is at the second level, and is overlapped with neither the period when the light emission control signal is at the first level nor the turn-on signal.

18. The display device according to claim 15, wherein the sensor comprises an ambient light sensor; and the target parameter comprises an ambient light signal.

* * * * *